United States Patent

[11] 3,567,165

[72] Inventor James C. White
P. O. Box 5454, Greenville, S.C. 29606
[21] Appl. No. 785,598
[22] Filed Dec. 20, 1968
[45] Patented Mar. 2, 1971

[54] SECURING MEMBER FOR A CLAMP
4 Claims, 3 Drawing Figs.

[52] U.S. Cl. .................................................. 248/68,
24/73, 248/74
[51] Int. Cl. ..................................................... F16l 3/14
[50] Field of Search .......................................... 248/74, 74
(PB), 230, 70, 231, 300, 73, 313, 316; 24/73.7,
274; 211/107

[56] References Cited
UNITED STATES PATENTS
1,601,612 9/1926 Edwards ........................ 248/231X

| | | | |
|---|---|---|---|
| 2,438,362 | 3/1948 | Dunkelberger ............... | 248/74X |
| 2,547,813 | 4/1951 | Coons .......................... | 248/74 |
| 2,560,486 | 7/1951 | Shears .......................... | 248/68 |
| 2,595,702 | 5/1952 | Prevost ......................... | 248/231 |

*Primary Examiner*—Chancellor E. Harris
*Attorney*—Newton, Hopkins & Ormsby

ABSTRACT: A securing member for a circular conduit-enveloping clamp wherein the securing member has a curvilinear saddle which engages a portion of the inner clamping surface of the clamp and a pair of leg portions integrally formed with the saddle and extending from opposed side edge portions thereof in a first downwardly and subsequently outwardly direction therefrom such that the leg members engage the surface onto which the clamp is to be secured, and an aperture in one of the leg members for receiving a fastener.

PATENTED MAR 2 1971 3,567,165

INVENTOR
JAMES C. WHITE

BY Newton, Hopkins, & Ormsby
ATTORNEYS 3,567,165

SECURING MEMBER FOR A CLAMP

BACKGROUND OF THE INVENTION

This invention relates generally to securing members and more particularly to a securing member for a circular conduit-enveloping clamp. Circular conduit-enveloping clamps are well known in the prior art, and have been found to be especially of advantage in securing a number of small tubes or conduits to create a single bundle which may be more readily handled. It has been found especially advantageous to clamp several small tubes or conduits into a single bundle when installing elongated sections of conduit in building construction, and in the manufacture of large electronic equipment.

When such devices have been utilized in the past, it has been necessary to provide separate securing means for attaching the conduits or bundles to the surface or surfaces to which they are to be attached. Separate securing devices have the inherent disadvantages of increasing the expense of manufacture and installation, rendering installation to be time consuming and expensive, and creating additional wear and tear on the conduits during installation and use.

SUMMARY OF THE INVENTION

Accordingly, an object of the present invention is to provide a new and improved securing member which is inexpensive to manufacture, durable in structure, and easy to install.

Another object of this invention is to provide a securing member for a circular conduit-enveloping clamp which is easily installed and is capable of supporting a conduit in any position.

A further object of the instant invention is to provide a securing member for a clamp which engages and bears upon the clamp itself without creating unnecessary wear and tear on the conduit.

A still further object is to provide a securing member for a clamp which obviates the necessity of having a separate conduit securing member, thus reducing wear and tear on the conduit.

A still further object of the instant invention is to provide a securing member for a circular conduit-enveloping clamp which is installed with a single fastener, thus creating a means for rapid and inexpensive installation.

Briefly, in accordance with one illustrative embodiment of this invention, the foregoing and other objects are obtained by providing a securing member for a conduit-enveloping clamp having a clamp-engaging saddle of generally curvilinear configuration with opposed side edge portions, a pair of leg members integrally formed with the saddle and extending from the opposed side edge portions for engaging a surface onto which the clamp is to be secured, and an aperture in one of the leg portions for receiving a fastener.

Many other advantages and objects of the present invention will become readily apparent as the following detailed description of the invention unfolds when taken in conjunction with the accompanying drawings.

DESCRIPTION OF THE ILLUSTRATIVE EMBODIMENT

Figure 1:
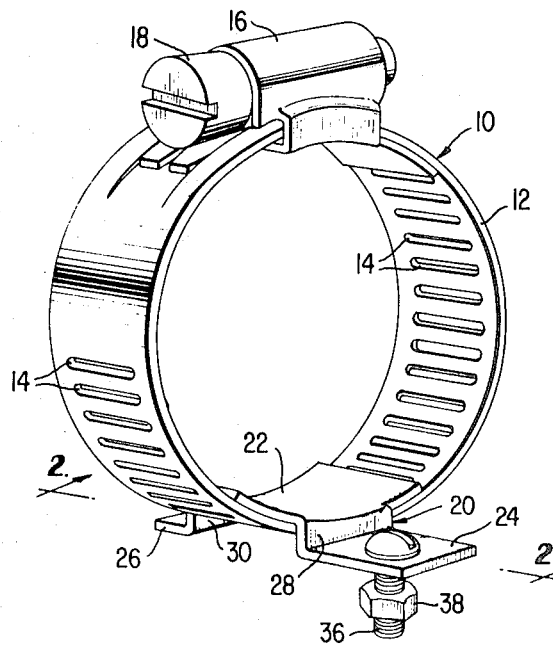
FIG. 1 is a perspective view of a securing member constructed in accordance with the present invention, with a conventional circular conduit-enveloping clamp held in place.

Referring now to the drawings, wherein like reference numerals designate identical or corresponding parts throughout the several views, and more particularly to FIG. 1 whereon a clamp 10 of conventional design is illustrated as having a circular tube-enveloping band 12 with transverse slots or apertures 14 along the majority of the length thereof, a housing 16 secured to one end of the band, and a band-tightening screw 18 of generally worm-gear configuration disposed in the housing with its threads engaged in the slots. Rotating the screw 18 from the exterior of the housing 16 causes the threads to translate the band 12 by drawing the same through the housing and tightening the band upon a conduit or bundle of small conduits or by pushing the same in an opposite direction through the housing to loosen the band. Such devices are well known in the prior art and the structure of the clamp illustrated in FIG. 1 is not part of the present invention, but is merely illustrative of a conventional worm-drive conduit clamp.

When installing long segments of conduit, it is necessary to secure the conduit at various positions along its length to the adjacent structure. A securing member, indicated generally at 20, is illustrated as securing the clamp 10 to a surface along which the conduit is being installed. The securing member 20 has a saddle 22 for engaging a portion of the inner clamping surface of the clamp 10, a pair of leg members 24 and 26 for engaging the surface onto which the clamp is to be secured, and interconnecting integrally formed segments 28 and 30 extending from the side edge portions of the saddle 22 to the leg members 24 and 26.

Figure 2:
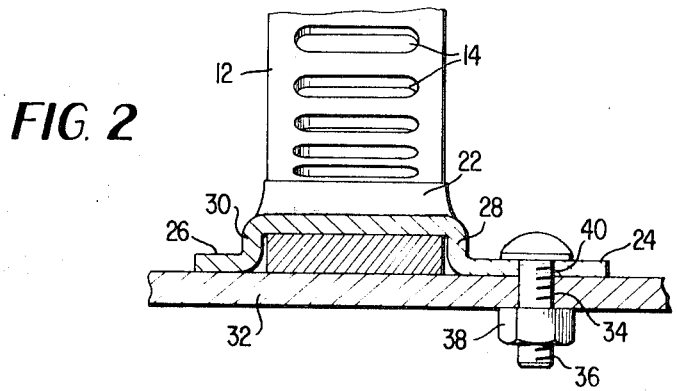
FIG. 2 is a fragmentary sectional view with parts broken away taken along the line 2-2 of FIG. 1.
Figure 3:
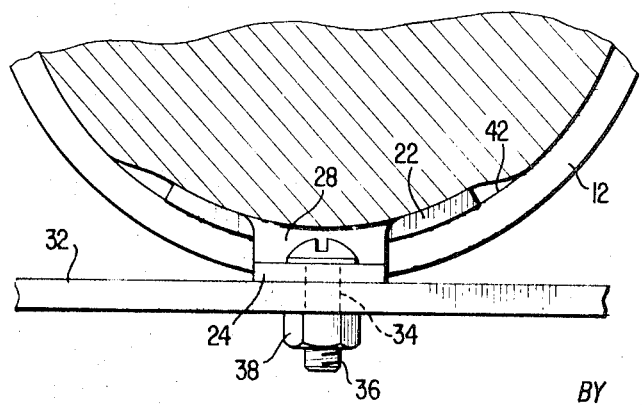
FIG. 3 is a side plan view, partly broken away, illustrating the conduit and clamp in the secured position.

Referring now to FIGS. 2 and 3, a surface 32 to which the clamp is to be secured, is illustrated as having an aperture 34 therein through which a conventional fastener 36 may be utilized to hold the securing member 20 to the surface 32. Although a nut 34 and a bolt 38 have been illustrated as fastening the securing member 20 to the surface 32, it is to be understood that any conventional fastening device such as a machine screw or rivet could be used, and the particular fastening device utilized plays no part in the present invention. An aperture 40 is provided in leg 24 such that the bolt 36 passes therethrough in alignment with aperture 34 in surface 32 to be engaged by nut 38 for fastening the securing member 20 to the surface 32. A similar aperture and fastening arrangement could be provided on leg 26 if so desired, but one such fastening device has been found to be adequate and quite obviously renders installation of long segments of conduit relatively easy and inexpensive. The interconnecting segments 28 and 30 retain the saddle 22 and legs 24 and 26 in separate planes which are spaced a distance substantially equal to the thickness of the clamp band 12.

The saddle 22, as more clearly shown in FIG. 3, has a curvilinear configuration generally conforming to the clamping surface 42 of band 12.

When installing a long segment of conduit, the securing member 20 is brought into engagement with band 12 of conduit clamp 10 and the aperture 40 in leg member 24 is brought into alignment with aperture 34 in the surface 32 such that fastener 36 may be inserted therethrough to hold the securing member and clamp in place. The conduit is subsequently inserted in the clamp member and by tightening screw 18 to decrease the circumference of clamp 10, the conduit is held in place against surface 32.

It will be obvious to those skilled in the art that many variations may be made in the embodiment chosen for the purpose of illustrating the present invention, without departing from the scope thereof, as defined by the appended claims.

I claim:

1. A clamp-receiving member for use in securing a flat band of generally circular form to a plane surface, said member comprising a saddle portion having a curvature corresponding to that of such band, and adapted to lie smoothly against the inside of the band, a projection extending outwardly from each side of the saddle portion in a plane at right angles to the curved surface thereof, said projections lying on the convex side of the saddle, being spaced apart by a distance approximately equal to the width of the band, and being substantially equal in length to the thickness of the band and a surface-engaging portion extending outwardly from each projection in a direction at right angles thereto, said surface engaging portions being flat and lying in a common plane, and one of them being provided with an opening adapted to receive a securing means for fastening the securing member to a plane surface.

2. A securing device as in claim 1 wherein the said projections extend along only a part of the saddle so that the length of the saddle portion is greater than the corresponding dimension of the projections.

3. In combination, a clamp comprising a flat band of generally circular formation, adjustable means for engaging the ends of the band to draw them together and a securing member adapted to secure the clamp to a flat surface and comprising a saddle portion having a curvature corresponding to that of the band, said saddle member lying smoothly against the inside of the band, an outwardly extending projection on each side of the saddle portion, said projections lying in planes at right angles to the said curved surface, one projection lying closely adjacent to each side of the band, so that the band is snugly received between them, each projection terminating in a straight edge lying in a plane tangent to that of the outer surface of the band, and a flat securing portion extending from each said edge in a plane at right angles to that of the corresponding projection, so that when the flat portions are placed against a plane surface a portion of the band will be closely fitted between the saddle and the surface, one of said surface-engaging portions having an aperture adapted to receive a means for securing such portion to such a surface.

4. The combination as in claim 3 wherein the said projections extend along only a part of the corresponding dimension of the saddle.